United States Patent
Goto

(10) Patent No.: US 6,595,695 B1
(45) Date of Patent: Jul. 22, 2003

(54) SEALED-TYPE ROLLING BEARING

(75) Inventor: Koichi Goto, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/831,173

(22) PCT Filed: Sep. 11, 2000

(86) PCT No.: PCT/JP00/06196
§ 371 (c)(1),
(2), (4) Date: Aug. 3, 2001

(87) PCT Pub. No.: WO01/20184
PCT Pub. Date: Mar. 22, 2001

(30) Foreign Application Priority Data

Sep. 10, 1999 (JP) .............................. 11-257924

(51) Int. Cl.[7] ............................................... F16C 33/78
(52) U.S. Cl. ....................................... 384/482; 384/488
(58) Field of Search ................................ 384/482, 484, 384/488, 485, 486

(56) References Cited

FOREIGN PATENT DOCUMENTS

| JP | 52-54693 | 12/1977 |
|----|----------|---------|
| JP | 60-107423 | 7/1985 |
| JP | 62-27263 | 2/1987 |
| JP | 7-43490 | 10/1995 |
| JP | 9-196066 | 7/1997 |
| JP | 11-230179 | 8/1999 |

Primary Examiner—Lenard A. Footland
(74) Attorney, Agent, or Firm—Katten Muchin Zavis Rosenman

(57) ABSTRACT

A seal plate 8 is located between the outer ring 1 and inner ring 3, and the outer diameter 11 side of the this seal plate 8 is fastened to the stationary ring 1, and the lip 13 an the inner-diameter 12 side comes into sliding contact with or keeps a clearance with respect to the inner ring 3 to secure seal performance, and there is a protruding section 19 formed on the side surface 18 on the outside of the seal plate 8, so that a clearance 29 is formed between the protruding section 19 and the peripheral part 25 near the bearing. Consequently, it is possible to provide a sealed-type rolling bearing where the seal performance is improved without increasing cost, by providing not only sealing in the lip portion but also sealing between the bearing and the peripheral part near the bearing.

2 Claims, 12 Drawing Sheets

SEALED-TYPE ROLLING BEARING

FIELD OF THE INVENTION

The present invention is related to a sealed-type rolling bearing.

BACKGROUND OF THE INVENTION

For example, the conventional sealed-type rolling bearing maintained its seal performance by lips 101, 102 that were formed on the inside and outside on the inner-diameter surface of a seal plate (seal) 100.

Recently, it is desired for this kind of bearing that the seal performance be improved without increasing the cost, and that the bearing adequately and precisely correspond to worsening operating conditions.

However, with the convention bearing, when there is a lot of water or dirt around the bearing, there is a high possibility that the water or dirt will directly reach the lips 101, 102. In this case, it is thought that the seal performance by just the lips 101, 102 will be deteriorated.

Taking the problems with the prior art into consideration, the object of this invention is to provide a sealed-type rolling bearing that is capable of not only sealing by the lips but also sealing between the bearing and the peripheral part near the bearing, and that improves the seal performance of the bearing without an increase in cost.

DISCLOSURE OF THE INVENTION

In order to accomplish the object described above, the technical measures provided by this invention comprise a seal plate that is located between the outer ring and inner ring, and where either the inner-diameter side or outer-diameter side of the this seal plate is fastened to the stationary ring, and the other maintains seal performance by coming into sliding contact with the rotating ring or keeping a clearance with respect to the rotating ring, and in which there is a protruding section formed on the side surface on the outside of this seal plate, which forms a clearance between this protruding section and the peripheral part near the bearing.

In addition, the inner peripheral surface of this protruding section faces the outer peripheral surface of the peripheral part near the bearing, forming the clearance therebetween.

Moreover, the sealed rolling bearing of this invention comprises: a first seal plate between the outer ring and inner ring and a second seal plate facing the first seal plate, and either the inner-diameter side or the outer-diameter side of this seal plate is fastened to the inner peripheral surface on the end of the outer ring, or to the outer peripheral surface on the end of the inner ring, and the other maintains seal performance by coming in sliding contact with or forming a clearance with respect to the inner ring or outer ring; and the second seal plate is fastened either to the inner peripheral surface on the end of the outer ring, or to the outer peripheral surface on the end of the inner ring, and where a protruding section is formed on the side surface on the outside of the first seal plate, and this protruding section forms a clearance between it and the second seal plate, such that the inner peripheral surface of the protruding section of the first seal plate faces the outer peripheral surface of the second seal plate to form the clearance between them.

The code numbers are as follows:
1: Outer ring, 3: Inner ring, 8: Seal plate, 11: Outer diameter, 12: Inner diameter
13: Lips, 14: First lip, 15: Second lip, 16: Third lip, 19: Protruding section,
25: Peripheral part near the bearing, 29: Clearance, 33: Inside surface of second seal plate, 34: Fourth lip

THE MOST PREFERRED EMBODIMENTS FOR WORKING THE INVENTION

Embodiments of the present invention will be explained below.

Figure 1:
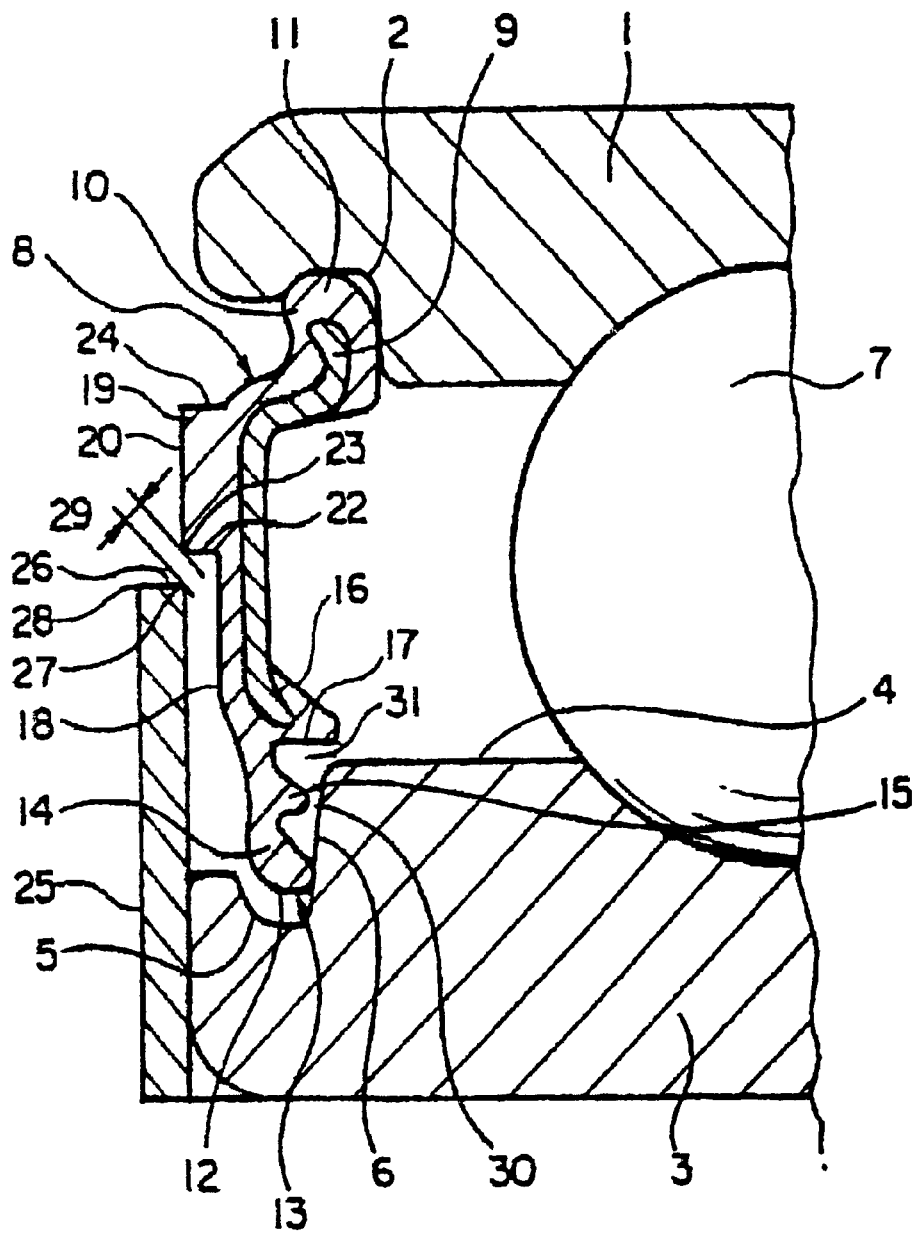
FIG. 1 is a partly cut-away, vertical cross-sectional drawing showing part of an embodiment (first embodiment) of the present invention.
Figure 2:
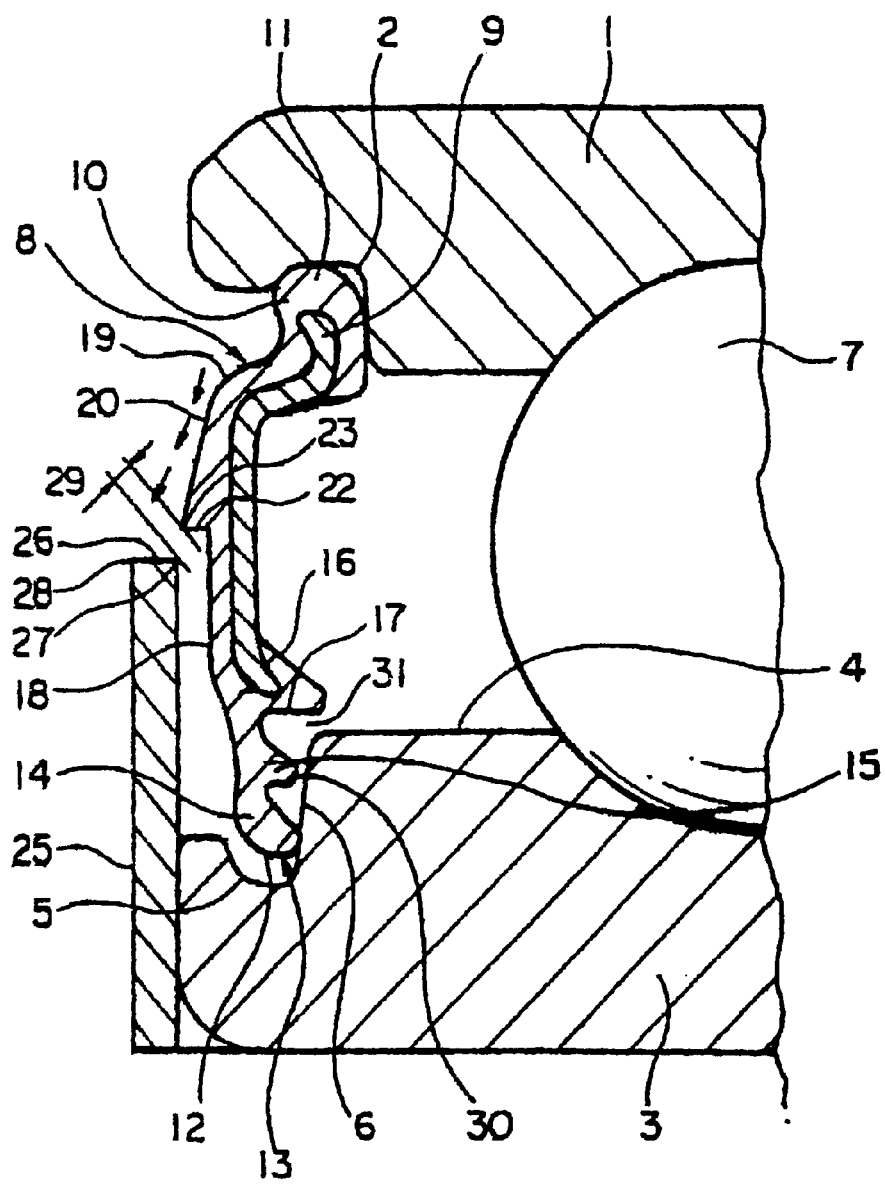
FIG. 2 is a partly cut-away, vertical cross-sectional drawing showing part of another embodiment of the present invention.
Figure 3:
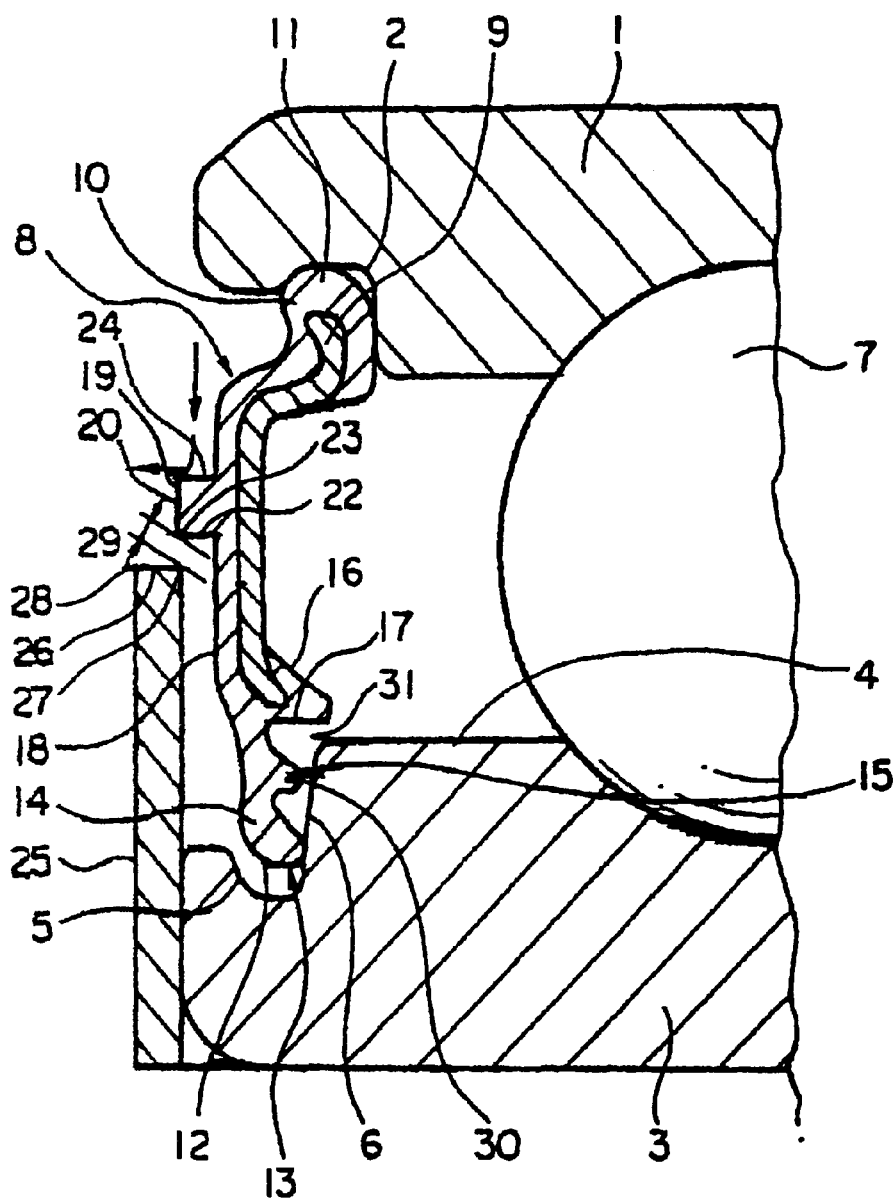
FIG. 3 is a partly cut-away, vertical cross-sectional drawing showing part of another embodiment of the present invention.
Figure 4:
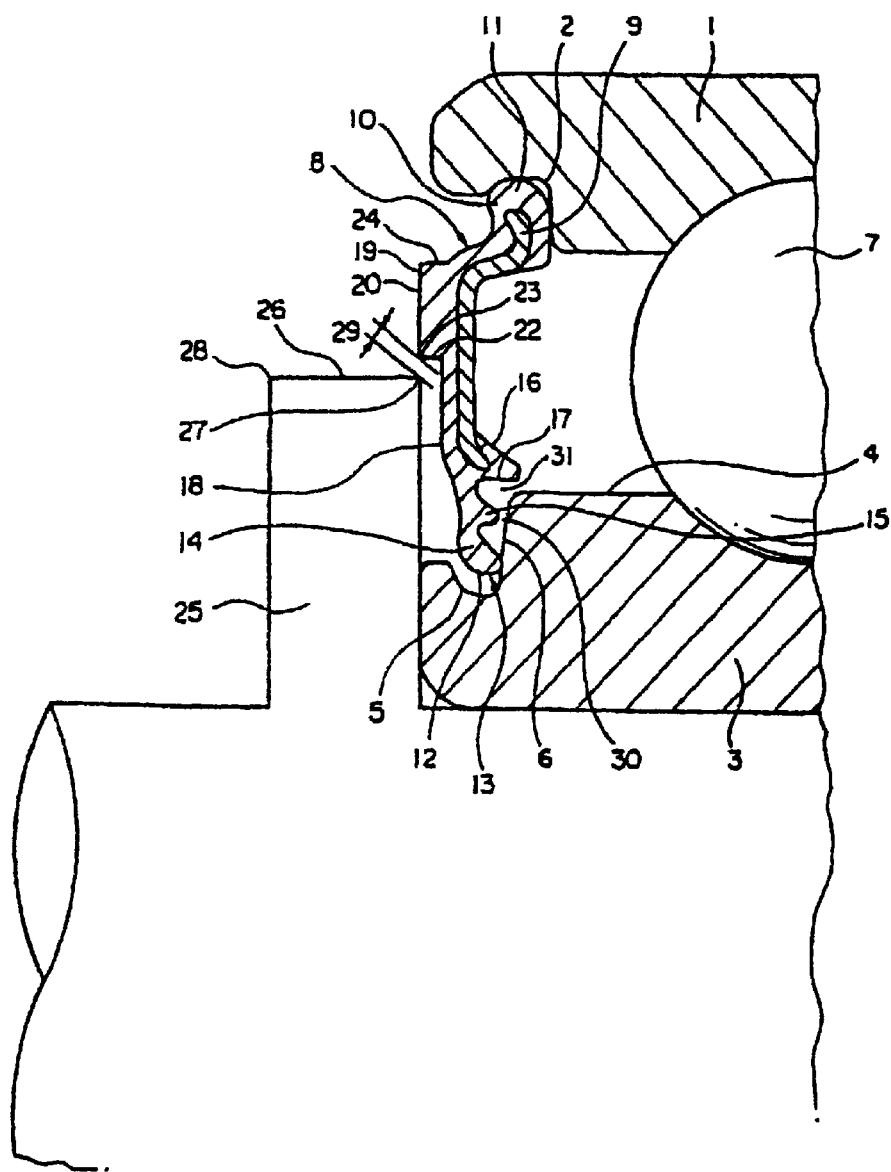
FIG. 4 is a partly cut-away, vertical cross-sectional drawing showing part of another embodiment of the present invention.
Figure 5:
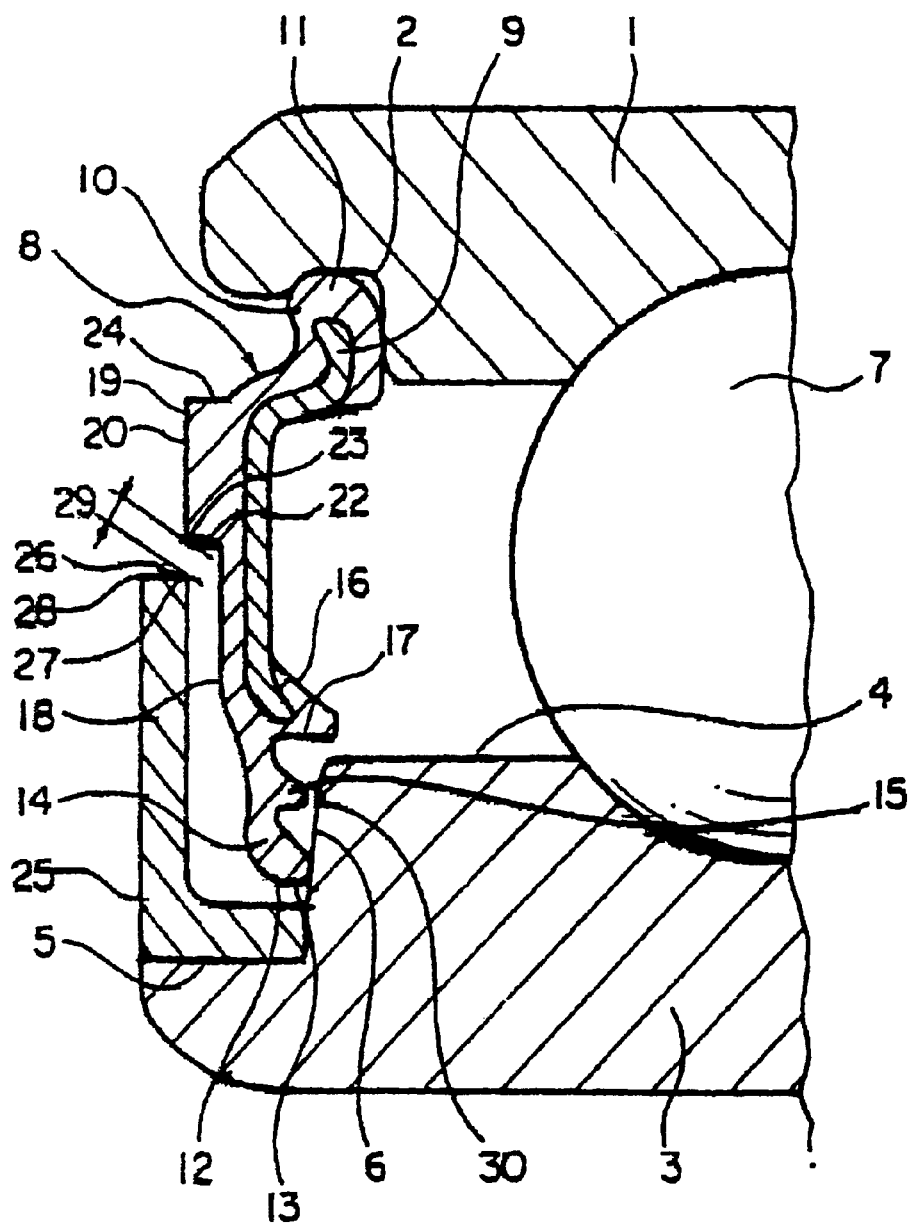
FIG. 5 is a partly cut-away, vertical cross-sectional drawing showing part of another embodiment of the present invention.
Figure 6:
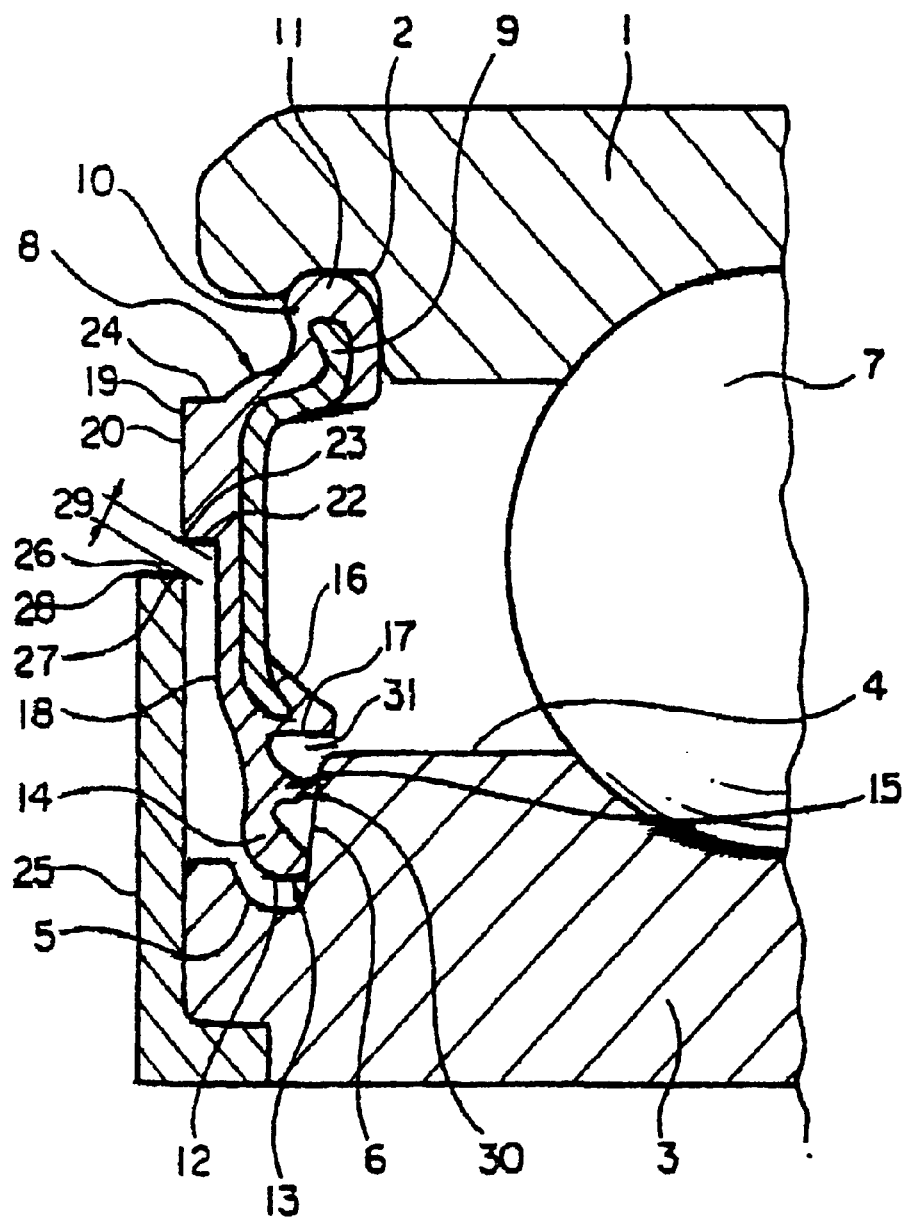
FIG. 6 is a partly cut-away, vertical cross-sectional drawing showing part of another embodiment of the present invention.
Figure 7:
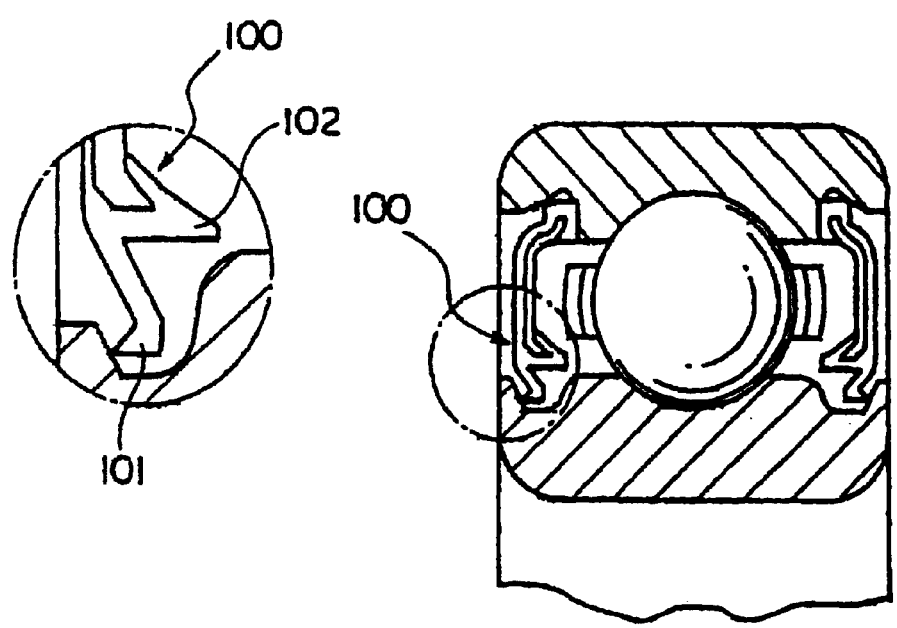
FIG. 7 is a partly cut-away, vertical cross-sectional drawing showing part of another embodiment of the present invention.
Figure 8:
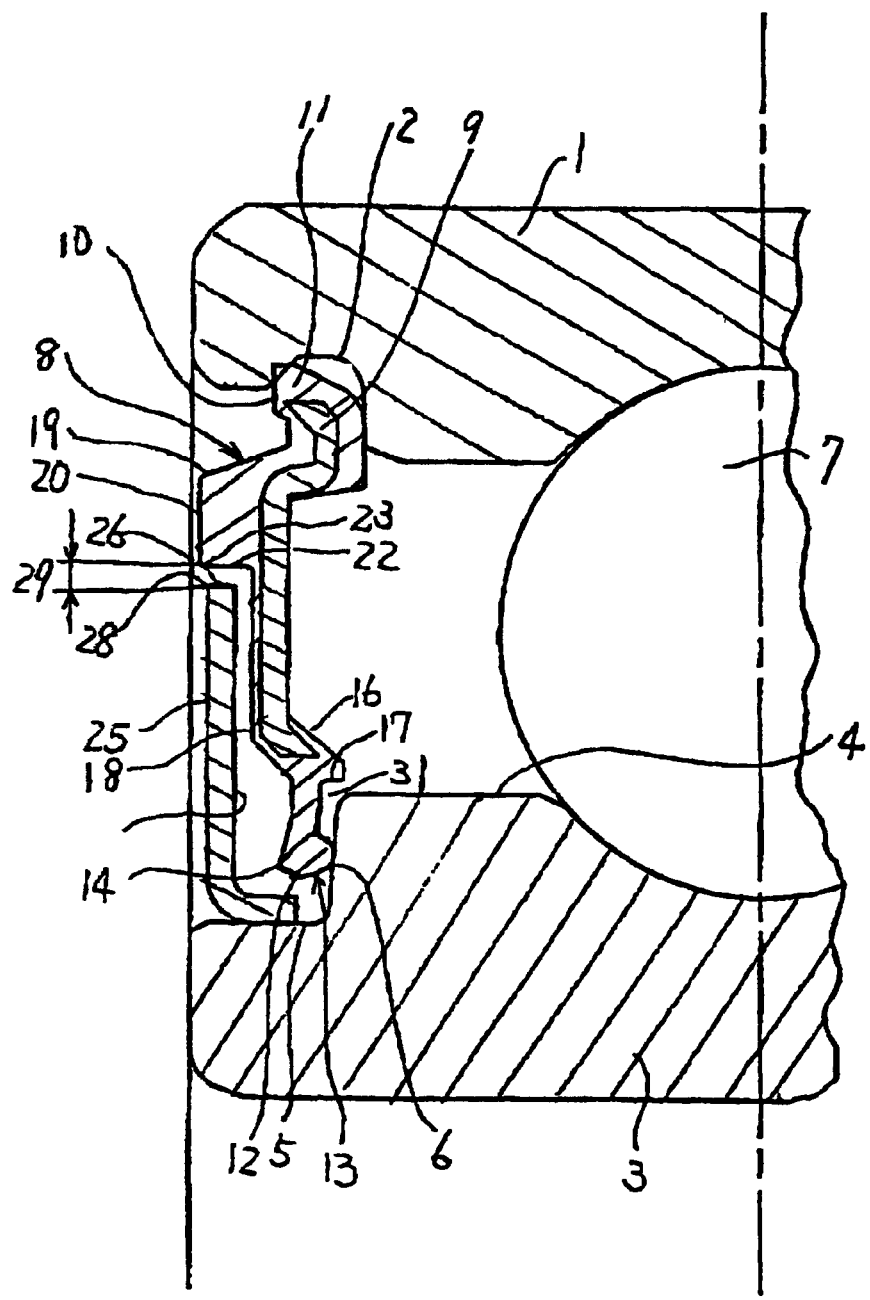
FIG. 8 is a partly cut-away, vertical cross-sectional drawing showing part of another embodiment of the present invention.
Figure 9:
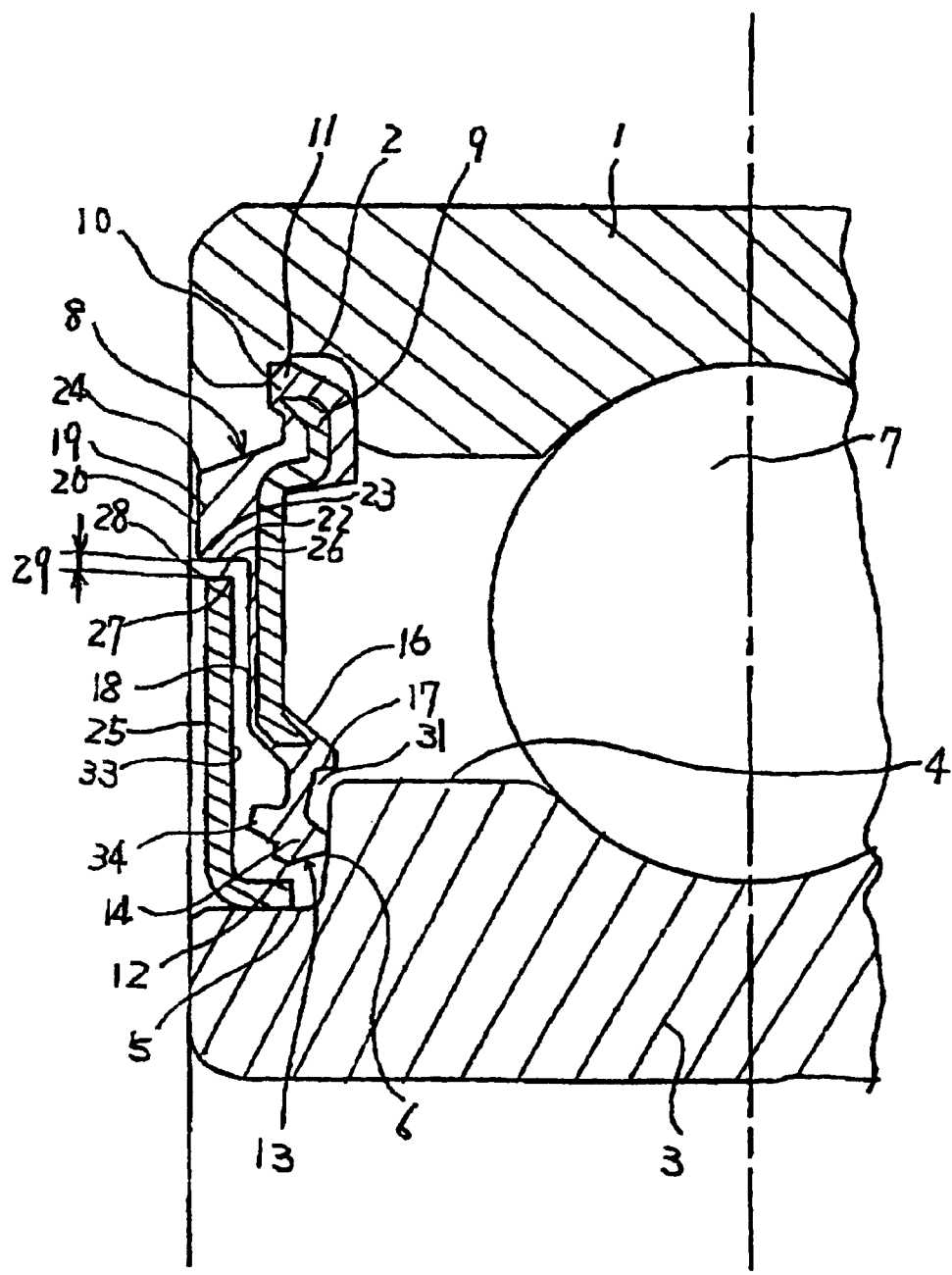
FIG. 9 is a partly cut-away, vertical cross-sectional drawing showing part of another embodiment of the present invention.
Figure 10:
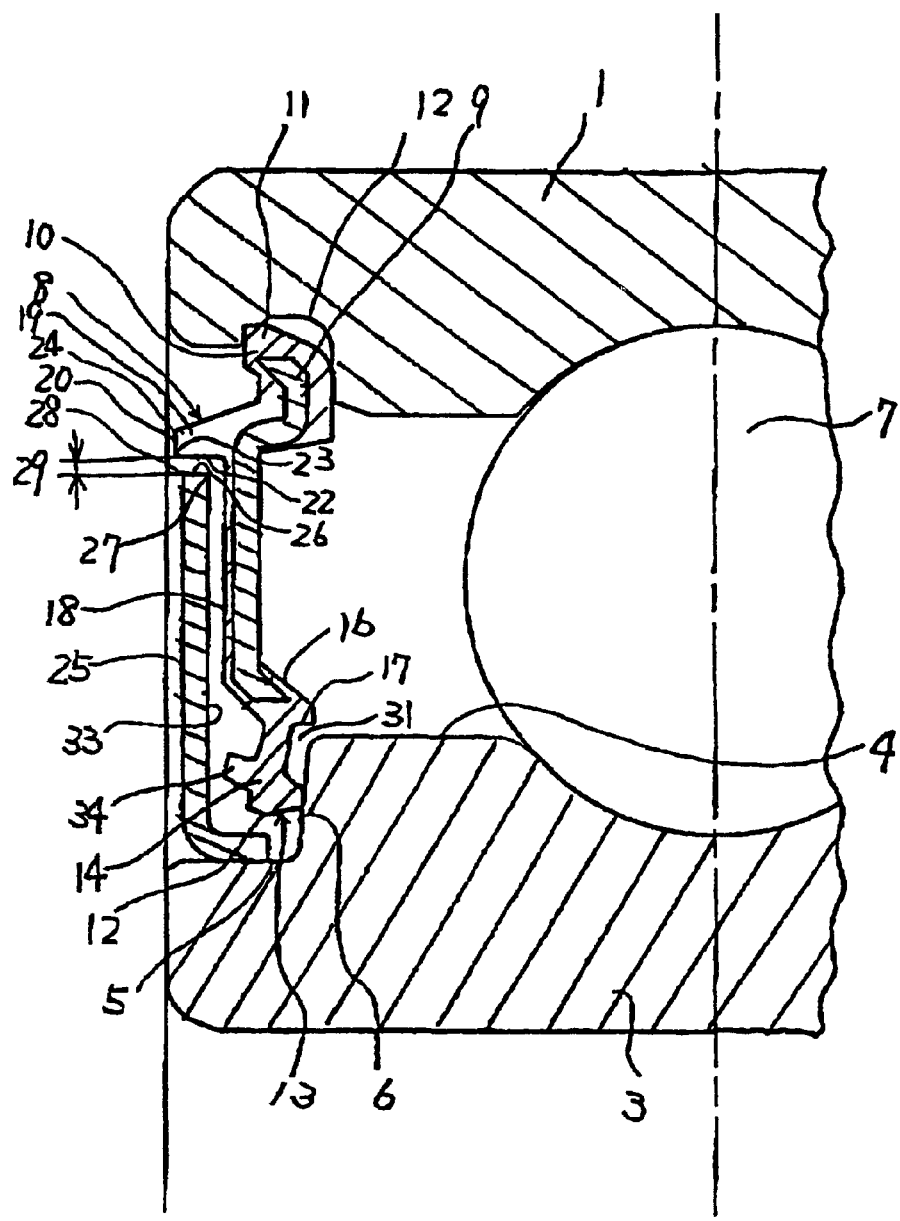
FIG. 10 is a partly cut-away, vertical cross-sectional drawing showing part of another embodiment of the present invention.
Figure 11:
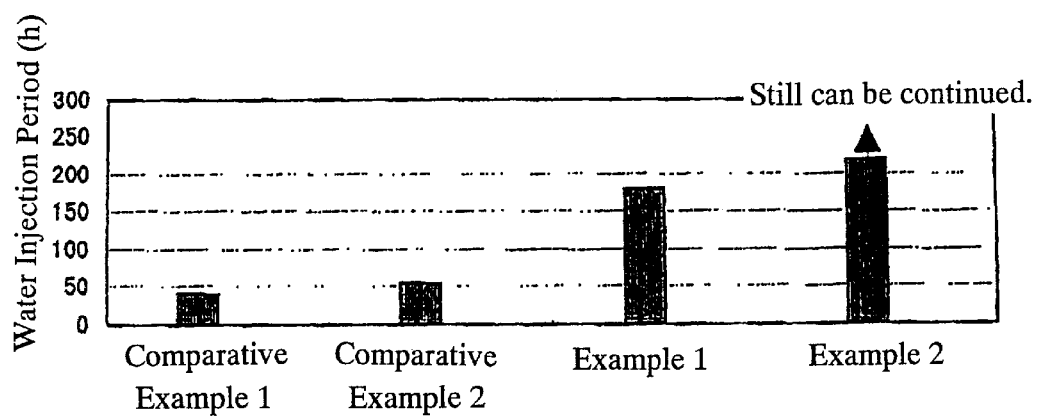
FIG. 11 is a drawing showing the effect of a water-injection experiment of the present invention.

FIG. 1 shows a first embodiment, FIG. 2 shows a second embodiment, FIG. 3 shows a third embodiment, FIG. 4 shows a fourth embodiment, FIG. 5 shows a fifth embodiment, FIG. 6 shows a sixth embodiment, FIG. 11 is a drawing of the experiment results showing the effect of the present invention, FIG. 7 shows a seventh embodiment, FIG. 8 shows an eighth embodiment, FIG. 9 shows a ninth embodiment and FIG. 10 shows a tenth embodiment.

In the figures, 1 is the outer ring, 3 is inner ring, 7 are rolling bodies, 8 is the seal plate, and 25 are the peripheral part near the bearing.

The sealed-type roller bearing of this invention is suitable for application for electrical equipment of automobiles or the like, however, the range of the application of this invention is not limited and can be applied to all kind of bearings such as for normal electrical equipment, small motors, etc.

In the embodiments of this invention, the construction of the outer ring 1, inner ring 3, and rolling bodies 7 are not limited to the construction shown in the drawings, and generally used shapes and structures can be adopted, so a detailed explanation of the construction is omitted in this explanation of the present invention.

The explanation of this invention is particularly centered on the seal plate 8 and the peripheral part 25 near the bearing and the relationship between them.

The seal plate 8 comprises a core member (made of metal or the like) 9 that is covered by an elastic member (made of rubber, synthetic resin or the like) 10 and formed such that it is generally circular, and where either the inner-diameter 12 side or outer-diameter 11 side is fastened to the stationary ring 1 side, and the lip 13 formed on the other maintains a seal performance by coming into sliding contact with or by keeping a clearance with the rotating ring 3 side, and where a protruding section 19 is formed on the side surface 18 on the outside such that the protruding section 19 forms a clearance 29 between it and the peripheral part 25 near the bearing.

In this embodiment of the invention, the outer-diameter 11 side is fastened by crimping or pressure fitting to the plate groove 2 in the outer ring (stationary ring) 1, and the plurality of lips 14, 15, 16 that are formed on the inner-diameter 12 side make a seal by coming into sliding contact with plate groove 5 in the inner ring (rotating ring) 3 or by forming a clearance 30 and labyrinth 31 with respect to the plate groove 5.

Moreover, a type of seal plate 8 without a core member 9 is also within the range of this invention.

There is one or a plurality of lips 13 (in this embodiment there are three, a first lip 14 to a third lip 16) that are formed, and in the case of there being just one lip 13, the lip is properly selected to face either inward or outward, and in the case of a plurality of lips, the lips are properly selected to face inward, outward or both directions, and part or all of them maintain a seal through sliding contact or by forming a clearance and labyrinth.

It is possible to have just one lip 13, however by having a plurality of lips, as described above, even when the seal performance of one of the lip decreases, the other lips cover for it, thus making it possible to maintain a seal performance over long period of time.

The construction of the lip 13, such as the shape, length, number of lips and whether the lip is a contact type or non-contact type is not limited and can be properly changed within the range of the invention.

The protruding section 19 has a cross section with any desired shape, and it is formed such that it is continuous in the circumferential direction with the side surface 18 on the outside of the seal plate 8, and the position of the protrusion is such that there is a narrow gap (clearance) 29 formed in the circumferential direction between the surface on the opposite end 22 and the end surface 26 of the peripheral part 25 near the bearing.

The width of the aforementioned narrow gap (clearance) 29 is not particularly limited and can be freely set within the range of the invention.

The protruding section 19 is not particularly limited, however, in this embodiment, the protruding section 19 is located such that the outer edge 23 of the opposing end surface 22 is substantially at the same level as the inner edge 27 of the end surface of the peripheral part 25 near the bearing.

Moreover, the narrow gap (clearance) 29 formed between the protruding section 19 and the peripheral part 25 near the bearing prevents water or dirt from reaching the lip 13 side to secure and improve the seal performance.

The shape of the protruding section 19 is not limited to the shape shown in the figures, and can be changed arbitrarily within the range of the invention. For example, the shape is not limited to a rectangular cross-sectional shape, but a desired cross-sectional shape could be selected such as a square, semi-circular, or triangular cross-section. Moreover, the shape of the end surface of the opposing end 22 that faces the part near the bearing is also not limited to the shape shown in the figure, and could be an uneven shape with a stepped section.

Moreover, it is also possible to form a protruding section that is zig-zag shaped or waved shaped in the circumferential direction such that there is a difference between high and low points in the radial direction, and such that there are a plurality of continuous protruding sections provided concentric with each other.

Furthermore, forming the protruding section such that it is not continuous in the circumferential direction is also within the range of this invention.

The peripheral part 25 near the bearing may typically be a cover plate or stepped shaft, and any part that is capable of forming a narrow gap 29 between its end surface (free end) 26 and the opposing end 22 of the seal plate 8 can be freely applied within the range of the invention. Also, in this invention, the slinger of the bearing is also included as the peripheral part 25 near the bearing.

Furthermore, the narrow gap 29, that is formed between the end surface 22 of the protruding section 19 and the end surface 26 of the peripheral part 25 near the bearing, prevents water or dirt from getting into the bearing, and the water or dirt is guided outside along the outer peripheral surface of the protruding section 19, so is prevented from getting into area of the lip 13.

Next, the first through the sixth preferred embodiments of the invention will be further explained in detail.

First Embodiment

In this embodiment, the seal plate 8 comprises an inward facing first lip (main lip) 14, second lip 15 and third lip 16 that are formed around its inner-diameter 12 side concentric with each other, and a protruding section 19 with a rectangular cross section that is formed around the side surface 18 on the outside of the seal plate 8 such that it is continuous in the circumferential direction.

The outer-periphery 11 of the seal plate 8 is crimped and fastened to the outer-ring plate groove 2, and the inward facing first lip 14, which is formed around the inner-diameter 12 side comes in contact (or it may form a narrow gap without coming in contact) with the wall surface 6 of the plate groove 5 of the inner ring 3. The inward facing second lip 15 is formed on the side surface on the inner side and has a larger diameter than the first lip 14, and it forms a narrow gap 30 between it and the wall surface 6 (or it may come in contact with the wall surface of the plate groove). Furthermore, the inward facing third lip 16 is formed on the side surface on the inner side and has a larger diameter than the second lip 15 and its surface 17 is continuous in the circumferential direction and parallel with the outer-diameter surface 4 of the inner ring 3 to form a labyrinth 31, so that the seal performance is secured.

Also, the opposing end surface 22 of the protruding section 19 faces the end surface 26 of the peripheral part 25 near the bearing to form a narrow gap 29 that is continuous in the circumferential direction, and this narrow gap 29 secures the seal performance by preventing water or dirt from entering in the direction of the lip 13.

The length of the protruding section 19 in the radial direction and the protruding length in the outward direction are not limited to that shown in the figure, and can be changed freely within the range of the invention.

Moreover, in this embodiment, the outer edge 23 of the opposing end surface 22 of the protruding section 19 is on the same level as the inner edge 27 of the end surface 26 of the peripheral part 25 near the bearing, however it is not limited by this, and the outward protrusion length of the protruding section 19 may be changed to move the outer edge 28 in the direction of the outer edge 28 of the end surface 26 of the peripheral part 25 near the bearing.

The construction of the first lip 14, second lip 15 and third lip 16, such as the shape, length and whether the lip is a contact type or non-contact type is not limited to the illustrated examples and can be properly changed within the range of the invention.

The narrow gap that is formed between the protruding section 19 and the peripheral part 25 near the bearing prevents surrounding water or dirt from getting inside, and the surrounding water or dirt is guided outside along the horizontal upper end surface 24 of the protruding section 19, so is prevented from getting into area of the lip 13, and thus the seal performance is improved.

Furthermore, since a plurality of lips, that is first lip 14 to third lip 16, are used, even when the seal of one of the lips decreases, the other lips cover for it, thus making it possible to maintain a seal performance over long period of time.

Second Embodiment

In this embodiment, only the construction of the protruding section 19 has been changed and the rest of the construction is the same as in the first embodiment. The explanation of the construction and function on the first embodiment is referred to and that for this embodiment is omitted here.

The outer surface 20 of the protruding section 19 is an inclined surface, and a narrow gap 29 that is continuous in the circumferential direction is formed between the opposing end surface 22 of the protruding section 19 and the end surface 26 of the peripheral part 25 near the bearing, and this narrow gap 29 secures the seal performance to prevent water or dirt from getting into the area of the lip 13.

Also, this narrow gap 29, that is formed between the protruding section 19 and the peripheral part 25 near the bearing, prevents surrounding water or dirt from getting inside, and the surrounding water or dirt is guided outside (direction of the arrow) along the inclined surface 20 of the protruding section 19, and is prevented from getting into area of the lip 13, and thus the seal performance is improved. The angle of inclination of the inclined surface 20 of the protruding section 19 is not particularly limited and can be freely selected.

The seal performance is secured by a plurality of lips, that is first lip 14 to third lip 16, and is the same as the first embodiment.

A plurality of concentric, circular protruding sections 19 may be formed, and the clearance may be formed between the opposing end surface of the protruding section that is the closest to the inner diameter and the end surface of the peripheral part near the bearing, which is within the range of this invention.

In this embodiment, the outer edge 23 of the opposing end surface 22 on the protruding section 19 is on the same level as the inner edge 27 of the end surface 26 of the part near the bearing, however, the present invention is not limited to this, and the angle of inclination can be changed such that this outer edge 23 is moved toward the direction of the outer edge 28 of the end surface 26 of the peripheral part 25 near the bearing.

Third Embodiment

In this embodiment, only the construction of the protruding section 19 has been changed to be different from that of the first embodiment and the rest of the construction is the same as in the first embodiment. An explanation of the construction and function of the first embodiment are referred to, and that on this embodiment is omitted here.

The protruding section 19 has a square cross-sectional shape, and a narrow gap 29 that is continuous in the circumferential direction is formed between the opposing end surface 22 of the protruding section 19 and the end surface 26 of the peripheral part 25 near the bearing, and with this narrow gap 29, the seal performance is secured to prevent water or dirt from getting into the area of the lip 13.

Also, this narrow gap 29, that is formed between the protruding section 19 and the peripheral part 25 near the bearing, prevents surrounding water or dirt from getting inside, and the surrounding water or dirt is guided outside (in the direction of the arrow) on the horizontal upper end surface 24 of the protruding section 19, and is prevented from getting into area of the lip 13, and thus the seal performance is improved.

Securing the seal performance by the plurality of lips, that is first lip 14 to third lip 16, is the same as in the first embodiment.

The length in the radial direction of the protruding section 19 and the protruding length outward, are not particularly limited to the illustrated example, and can be freely changed within the range of the invention.

Moreover, in this embodiment, the outer edge 23 of the opposing end surface 22 on the protruding section 19 is on the same level as the inner edge 27 of the end surface 26 of the peripheral part 25 near the bearing, however, the position is not limited to this, and the protruding length can be changed such that this outer edge 23 is moved toward the direction of the outer edge 28 of the end surface 26 of the peripheral part 25 near the bearing.

Fourth Embodiment

In this embodiment, the peripheral part 25 near the bearing is formed in a specific shape having a stepped shaft, and the other construction is the same as in the first embodiment. The explanation of the construction and functions of the first embodiment are referred to, and that on the present embodiment is omitted here. Also, the construction of the stepped shaft is not limited to that shown in the figure and a stepped shaft of other construction that is within the range of the invention can also be applied.

Fifth Embodiment

In this embodiment, the peripheral part 25 near the bearing is formed in a specific shape having a slinger, one of the bearing parts, and the other construction is the same as in the first embodiment. The explanation of the construction and functions of the first embodiment shall be referred to as, and those of this embodiment are omitted here. Also, the construction of the slinger is not limited to that shown in the figure, and a slinger of other construction that is within the range of the invention can also be applied.

Sixth Embodiment

In this embodiment, similar to the fifth embodiment, a specific shape of the slinger for the peripheral part 25 near the bearing is used, and only the assembly differs from the slinger of the fifth embodiment. The other construction is the same as in the first embodiment. The explanation of the construction and functions of the first embodiment are referred to, and those of this embodiment are omitted here. Moreover, the construction of the slinger shown in the figure is just an example as in the fifth embodiment.

Seventh Embodiment

In this embodiment, only the construction of the protruding section 19 is different from the first embodiment, and the other construction is the same as in the first embodiment. The explanation of the construction and functions of the first embodiment are referred to, and that on the present embodiment is omitted here.

The protruding section 19 has a square cross-sectional shape, and a narrow gap 29 that is continuous in the circumferential direction is formed between the opposing end surface 22 of the protruding section 19 and the end surface 26 of the peripheral part 25 near the bearing, and.with this narrow gap 29, the seal performance is secured to prevent water or dirt from getting into the area of the lip 13 by forming a first labyrinth section with the narrow gap 29.

Also, this narrow gap 29, that is formed between the protruding section 19 and the peripheral part 25 near the bearing, prevents surrounding water or dirt from getting inside, and since the protruding section 19 surrounds the outer surface 26 of a second seal plate to face it, the surrounding water or dirt is prevented from getting into area of the lip 13, and thus the seal performance is improved.

Securing the seal performance by the plurality of lips, that is first lip 14 to third lip 16, is the same as in the first embodiment.

The length in the radial direction of the protruding section 19 and the protruding length outward, are not particularly limited to the illustrated example, and can be freely changed within the range of the invention.

Moreover, in this embodiment, when the clearance between the opposing end surface 22 of the protruding section 19 and the outer peripheral surface 26 of the second seal plate is 0.2 mm±0.2 mm for an inner diameter of the bearing between 8 mm and 20 mm, it is possible to have sufficient seal effects and to obtain a product which is stable in processing parts.

Eighth Embodiment

In this embodiment, only the construction of the second seal plate has been changed, and the other construction is the same as in the seventh embodiment. The explanation of the construction and functions of the seventh embodiment shall be referred to, and that of the present example is omitted here.

The second seal plate 25 is fastened to the inner peripheral surface on the end of the outer ring that faces the first seal plate, or outer peripheral surface on the end of the inner ring, so that it is not necessary to change the prior art bearing dimensions. Therefore, there is no need to change the design of the surrounding parts including the mating parts, so there is no rise in cost and there is high flexibility in its application. Moreover, no protrusion gets in the way when handling the bearing, so that handling is very convenient.

The narrow gap 29, that is formed between the protruding section 19 of the first seal plate and the second seal plate 25, prevents surrounding water or dirt from getting inside, and since the protruding section 19 surrounds the outer peripheral surface 26 of the second seal plate to face it, the surrounding water or dirt is prevented from getting into area of the lip 13, and thus the seal performance is improved.

Securing the seal performance by the plurality of lips, that is first lip 14 to third lip 16, is the same as in the first embodiment.

Ninth Embodiment

In this embodiment, only the construction of the second seal plate has been changed, and the other construction is the same as in the eighth embodiment. The explanation of the construction and functions of the eighth embodiment shall be referred to, and that of the present example is omitted here.

The outer dimension of the second seal plate 25 is made as large as possible and still have space for the protruding section 19 of the first seal plate to be constructed, so that the distance of the second labyrinth section, that is formed between the outside surface 18 of the first seal plate and the inside surface 33 of the second seal plate can be made long.

Foreign matter is prevented from moving in the direction of the lip 13, thus the seal performance is further improved.

Securing the seal performance by the plurality of lips, that is first lip 14 to third lip 16, is the same as in the first embodiment.

Tenth Embodiment

In this embodiment, only the construction of the first seal plate is changed from that of the eight embodiment, and the other construction is the same as in the eighth embodiment. The explanation of the construction and functions of the eighth embodiment shall be referred to, and that of the present example is omitted here.

The first seal plate 8 is fastened to the inner peripheral surface on the end of the outer ring or to the outer peripheral surface on the end of the inner ring to face the second seal plate. Also, on the inner peripheral portion of the first seal plate there is a new outward facing lip, that is fourth lip section 34 that faces the second seal plate, and it forms a third labyrinth section between it and the inner peripheral surface 33 of the second seal plate.

The labyrinth structure that is formed between the protruding section 19 of the first seal plate and the second seal plate 25 is reinforced, so that foreign matter is prevented from moving in the direction of the lip 13, and the seal performance is further improved.

FIG. 11 is a drawing that uses a water injection test to explain the effect of the invention. The performance of the seal was confirmed under the following test conditions.

Test Conditions

Test bearing: OD 35 mm×ID 15 mm×W 14 mm

Axial load: 490 N

Radial load: 0 N

RPM: 1800 rpm

Injection conditions: 200 cc/min. From a distance 10 mm above toward the bearing seal surface.

Figure 12:
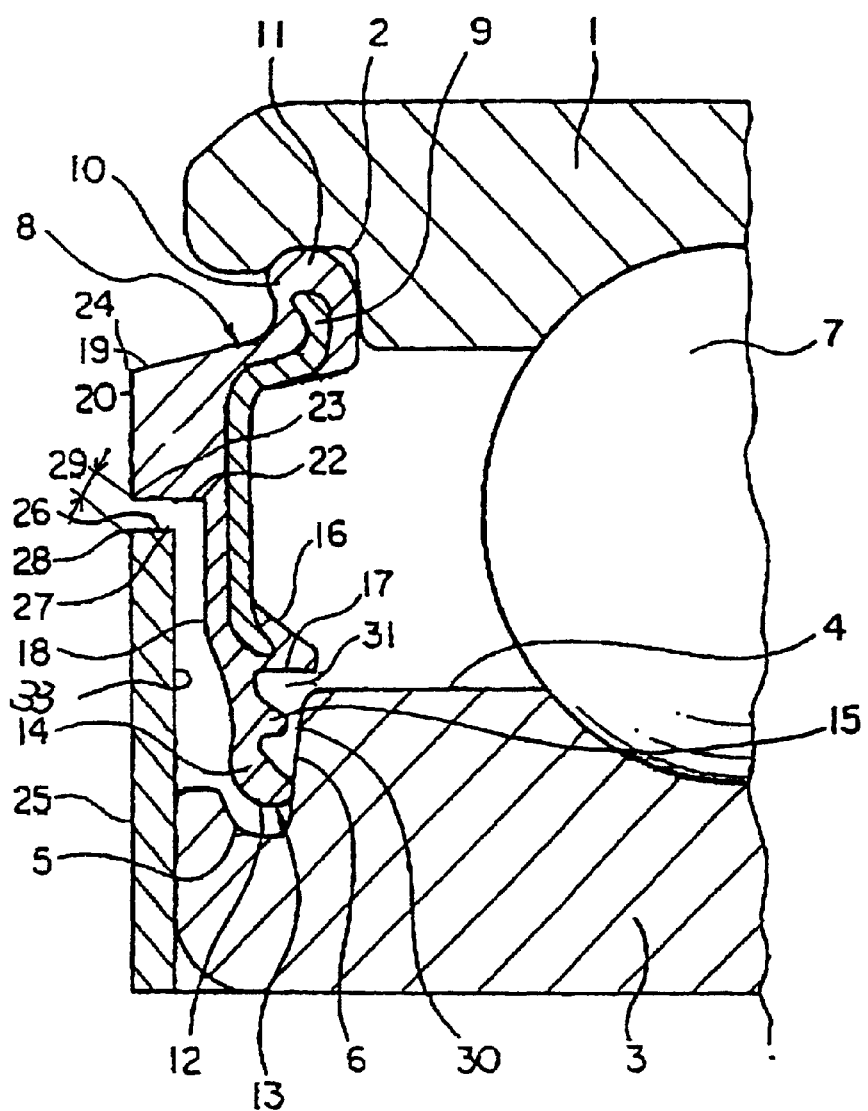
FIG. 12 is a vertical cross-sectional drawing showing the prior art.

Comparative example 1: Prior art seal construction (corresponds to the construction in FIG. 12)

Comparative example 2: The construction of comparative example 1 with the second seal plate.

Example 1: Corresponds to the seventh embodiment.

Example 2: Corresponds to the tenth embodiment.

From the results of the water injection test, preventing water from getting inside is clearly improved, and when the fourth, outward facing lip is added to the first seal plate, extremely good seal performance is obtained.

In the first to the sixth embodiments described above, a bearing with a stationary outer ring, and rotating inner ring was explained, however, the invention is not limited to this and the type with a rotating outer ring and stationary inner ring is also within the range of this invention.

Industrial Application

This invention, constructed as described above, maintains the seal performance by having either the inner-diameter side or outer-diameter side of the seal plate come in sliding contact with or forming a clearance with the rotating ring, and the protruding section on the side surface on the outside of the seal plate forms a clearance with the peripheral part near the bearing to prevent water and dirt from getting into the lip section through the clearance, so that it is possible to provide a sealed-type rolling bearing with improved performance without increasing the cost. Moreover, with the sealed-type rolling bearing of this invention, it is possible to obtain a sufficient and sure seal effect even under conditions of large amounts of surrounding water and dirt.

What is claimed is:

1. A sealed-type rolling bearing comprising:

an outer ring and an inner ring having a side face, one of the outer and inner ring being stationary and the other being rotatable, a first seal plate having the inner-diameter side or outer-diameter side, said first seal plate being located between the outer ring and inner ring on the axially inside of the side face, either the inner-diameter side or outer-diameter side of the first seal plate being fastened to the stationary ring and the other maintaining seal performance by coming into sliding contact with the rotating ring, a second seal plate located between the outer ring and the inner ring on the axially inside of the side face and on the axially outside of the first seal plate and fastened to the rotatable ring, and a protruding section formed on the axially inside of the side surface on the axially outside of the first seal plate, so that a clearance is formed between the protruding section and the second seal plate.

2. The sealed-type rolling bearing of claim 1, wherein the protruding section has an inner peripheral surface and the second seal plate has an outer peripheral surface and wherein the clearance is formed therebetween.

* * * * *